United States Patent [19]

Smith

[11] 3,757,786

[45] Sept. 11, 1973

[54] SYNTHETIC SURGICAL SUTURES

[76] Inventor: David F. Smith, 120 Grove St., Bay Head, N.J. 08742

[22] Filed: Nov. 6, 1970

[21] Appl. No.: 87,603

[52] U.S. Cl. ............................................. 128/335.5
[51] Int. Cl. ............................................. A61l 17/00
[58] Field of Search ....................... 128/335.5, 296; 260/231

[56] References Cited
UNITED STATES PATENTS

| | | | |
|---|---|---|---|
| 2,764,159 | 9/1956 | Masci et al. .......................... | 128/296 |
| 3,114,591 | 12/1963 | Nichols et al. ................ | 128/335.5 X |
| 3,122,479 | 2/1964 | Smith .......................... | 128/335.5 UX |
| 3,297,033 | 1/1967 | Schmitt ............................. | 128/335.5 |
| 3,565,077 | 2/1971 | Glick ................................ | 128/335.5 |

Primary Examiner—Robert W. Michell
Assistant Examiner—George M. Yahwak

[57] ABSTRACT

Synthetic surgical sutures with a controllable range of properties are made from water-insoluble metal salts of cellulose acid ethers.

13 Claims, No Drawings

SYNTHETIC SURGICAL SUTURES

This invention discloses surgical sutures made from water-insoluble metal salts of cellulose acid ethers, to replace the resorbable sutures ("catgut") made from sheep intestines, which are variable in thickness, strength and tissue reaction; as well as to replace other presently available sutures such as silk, cotton and nylon that are not resorbable. In my patent U. S. Pat. No. 3,499,449, are disclosed resorbable sutures made from cellulose acid ethers but it is now discovered that certain water-insoluble metal salts of such cellulose acid ethers can be used to make sutures with a wide range of useful strengths and resorption characteristics in live mammalian tissue.

The cellulose acid ethers (herein designated cgae) of the present invention include cellulose glycolic acid ether, cellulose hydroxypropionic acid ether and hydroxyethyl cellulose glycolic acid ether; and cellulose glycolic acid ether and cellulose hydroxypropionic acid ether wherein up to one-half of the hydroxyl groups of the acid ether are substituted by methoxy, ethoxy or propoxy groups which are herein called "lower alkoxy" groups. Such acid ethers are normally available as their sodium salts (or other alkali-metal salts) — which are water-soluble, presumably existing in aqueous solution in hydrated form as a more or less viscous solution. There are many cellulose acid ethers used herein, of different chain length or degree of polymerization (DP) from about 200 to 1000 and molecular-weight from 25,000 to 200,000 and of different average degree of substitution (DS) of the hydroxyl groups of the anhydroglucose units of the cellulose, between the extreme limits of 0 and 3 but herein from about 0.4 to 2, and mostly 0.4 to 1.4. The materials of the present invention include the non-toxic, essentially water-insoluble salts of the aforesaid cellulose acid ethers with the cations of aluminum, chromic, ferric, ferrous, silver, stannous and zinc. The formation of such salts presumably involves cross-linking by the polyvalent ions and ionic bonding or complexing. The molecular-weights or chain lengths (DP) of the polymers will be described in terms of the viscosities of aqueous solutions of the sodium salts of the cgae used; viz. low DP with viscosity of 18 to 50 centipoises in 2 weight percent aqueous solution at 25°C., medium with 50 to 7,100 cps. in 2 percent solution and high with 400 to 4,500 cps. in 1 percent solution. Each is usually a mixture, but purer material with narrower ranges of DP and DS, can be made by adding ethyl or isopropyl alcohol to their aqueous solutions which will precipitate first the polymers of higher DP and lower DS. (Commercially available sodium salts of cgae are described in the Bulletin "Cellulose Gum" by Hercules Incorporated, Wilmington, Del., 1966.) The trivalent cations can cause cross-linking which increases with increasing concentration of polymer, increasing ratio of cation to polymer and increasing DS. The rate of precipitation of insoluble salts can be retarded, for example, by complexing the cation— in the case of aluminum by the presence of anions like acetate, tartrate, citrate and phosphate, so that a solution of aluminum acetate and the sodium salt of cgae (this salt being known as CMC) can be extruded as a filament or poured on a glass plate to form a film before the insoluble salt precipitates. Such a filament or film should then be warmed, dried and stretched to just under its limit of stretchability as it dries and held under tension to orient the molecules and relax the structure so as to yield a strong, unstretchable product. The stretching and drying is done at a temperature between 40° and 90°C. It is preferred, however, to orient the molecules through the action on their polar groups of diffusion- and membrane-potentials as in U.S. Pat. No 3,499,449. A dialysis tube permeable to the small, metal ions but not to the aions of the cgae or CMC, is closed at one end and filled with the aqueous, soluble salt solution and immersed in an aqueous solution of the CMC. As the cations of the salt solution diffuse through the wall of the dialysis tube, into the CMC solution, a film of the insoluble salt of cgae forms on the outside of the dialysis tube. The potential arising from the unequal diffusion rates of the ions through the film, acting upon the polar groups of the precipitated film, forms successive layers of well oriented molecules of the insoluble cgae salt. The farther the diffusion proceeds, by using increased soluble salt concentration and increased time, the greater the cross-linking and other reaction of the cations with the CMC and the more insoluble the resulting cgae salt. A high soluble salt concentration and low CMC concentration permits more complete reaction of the precipitating cations and the CMC to form more insoluble (less easily resorbable) salt. After the film has reached the desired thickness (not over 10 mils, and preferably not over 5 mils) and has been sufficiently reacted, the tube is removed, the soluble salt removed and the tube and film thoroughly washed with water. The film is then stripped from the tube and may be twisted to form a filament or slit lengthwise to form strips to be twisted or braided to make a composite strand and then stretched heated and dried under tension.

Another method is to extrude a viscous aqueous solution of CMC into an aqueous solution of the precipitating cation whilst stretching the so-formed filament as the insoluble cgae salt forms. This strand is then washed in water, stretched and warmed and dried under tension. Fine filaments can be twisted or braided to form composite threads. The diffusion of the cations into the extruded filament gives rise to diffusion- and membrane-potentials which orient the molecules. The dwell-time in the soluble salt solution is adjusted to give the desired degree of reaction of the CMC to give insoluble salt, or the first-precipitated strand may be later soaked in the soluble salt solution to extend the reaction.

The thickness of films and strands should not be over 10 mils and preferably not over 5 mils so that the diffusion processes do not require too long a time. The stretching, warming and holding are very important in further increasing strength and relaxing the structure to yield a final product that is strong and essentially non-stretchable— the latter so that when used as a suture it will not cause continuing pressure to constrict and necrotize the tissues.

Films or filaments that tend to be insufficiently pliable can be plasticized with polyols such as propylene glycol, glycerin, polyglycols or sorbitol. However it is preferred to include in the CMC solution up to 10 percent of the weight of CMC, a water-insoluble but tissue resorbable material such as casein or zein.

The following Examples illustrate specific embodiments of my invention but are not intended to limit its scope.

EXAMPLE 1

A 10 weight percent aqueous solution of $Al_2(SO_4)_3$ was placed in a length of dialysis tubing which was closed at the bottom end and suspended in a 2 wt. percent aqueous solution of CMC of 0.7 DS and 25 cps. viscosity. After about 12 hours a thin film was formed on the outside of the tubing, at which point the tubing was withdrawn from the CMC solution, the $Al_2(SO_4)_3$ solution poured out of the tubing and the tubing and film thoroughly washed with water. The film was then stripped from the tubing, further washed, slit into narrow strips and then twisted into a filament, stretched and held under tension at a point just under its limit of stretchability (its elastic limit) and dried in stretched condition at about 60°C. The final filament has a thickness of about 4 mils, held a knot well, had good knot strength and a straight-pull tensile strength of 0.6 lb. corresponding to about 2.8 grams per denier. This compares to a straight-pull strength of about 0.5 lb. for a similar strand of surgical gut (catgut). A piece of the filament was threaded on a needle and placed in a polyethylene envelope with a drop of propylene oxide to sterilize it and then the envelope was sealed. The suture was removed from the envelope, soaked in sterile water and drawn through the abdominal muscle of a rabbit. It showed disintegration in about 1 week. Another portion of the film so-formed was soaked in $Al_2(SO_4)_3$ solution for several hours in order to further insolubilize it. It was then washed and similarly tested in the tissue of a rabbit. It disintegrated much more slowly.

EXAMPLE 2

A 10 wt. percent aqueous solution of $Al_2(SO_4)_3$ was placed in a piece of dialysis tubing which was closed at one end and suspended in a 2 wt. percent aqueous solution of high viscosity CMC of 0.7 DS and about 2,000 cps. viscosity in 1 wt. percent aqueous soltuion. After standing overnight a thin film was formed on the outside of the tubing, at which point the tubing was withdrawn from the CMC solution, the tubing with its film was soaked for several hours in 10 percent aluminum sulfate solution. The tubing was then withdrawn, the solution poured out and the tubing with its film thoroughly washed with water inside and out. The film was then stripped from the tubing, slit lengthwise into strips and several strips twisted together so as to form a composite final thread, again about 4 mils in thickness (average diameter). The thread was then stretched, heated and dried as before. It was then attached to a needle and sealed in a polyethylene envelope with a drop of propylene oxide to sterilize strand, needle and the inside of the envelope, in condition for subsequent use as a suture in animal tissue. This suture was very strong but was not absorbable in animal tissue.

It is readily seen from the foregoing that a wide range of suture characteristics of both strength and resorbability can be achieved by:

1. Varying the nature of the precipitating cation from those enumerated above;
2. Varying the concentration of the CMC solution;
3. Varying the degree of reaction of the precipitating cation in point of time of reaction and concentration;
4. Varying the DP and DS of the CMC.

For greater resistance to resorption one uses (1) the cgae salt of greatest insolubility, preferably the salt of a polyvalent cation, like aluminum ion that has a cross-linking action (2) a CMC of high DS that offers more opportunity for cross-linking and reaction with the precipitating cation (3) a CMC of high DP (4) conditions that result in more nearly complete replacement of the Na ion of the CMC. For a high retention of strength for at least 4 days in live mammaliam tissue and complete disintegration in less than 90 days, it is preferred to use, for example, the aluminum cation reacting with a CMC of viscosity between 18 and 2,000 cps. in 2 wt. percent solution and of DS from 0.4 to 1.4. It is not required that the Na ion of the CMC always be completely displaced by the precipitating cation. It is even possible, for example, for the polyvalent cation to cross-link 2 molecules of CMC by replacing an Na ion from 1 molecule of CMC and an Na ion from the second CMC molecule and still leave some of the Na ions on the doubled molecule. Any Na ions left undisplaced will make the product less resistant to resorption— as a matter of fact such undisplaced Na ions can be displaced by extensive washing with water since hydrolysis occurs to remove Na as NaOH and expose the acid group of the acid ether so that excessive washing in this case can increase resorbability.

The sutures can be stored dry in polyethylene, polypropylene, polyvinyl or polyamide envelopes or in glass tubes; or in ethyl alcohol containing 5 to 10 wt. percent water (normal non-boilable catgut tubing-fluid) which may contain antibiotics or antiseptic materials such as phenyl mercuric benzoate or acetate. The sealed suture package may be stored in aqueous, alcoholic formaldehyde so as to sterilize the outside of the package but in this case the package must be impervious to the formaldehyde solution so as not to contaminate the suture therewith. Sterilization may be by the usual methods such as (1) heating in an inert, high-boiling liquid such as xylene (2) by ethylene or propylene oxide (3) by moist formaldehyde vapor or (4) by X-rays, gamma rays, electron discharge, etc.

Obviously when using dialysis tubing, the time for obtaining a film of desired thickness will depend upon concentrations of the precipitating cation and the CMC, and the permeability of and thickness of the dialysis tubing. The tubing may be of vegetable parchment, regenerated cellulose or any material permeable to the small ions but not to the large CMC anions. The procedure outlined above may be carried out at room temperature or, in order to speed up diffusion rates through dialysis tubes or into strands or films, the solutions may be warmed up to as high as about 60°C. The filaments when stored dry may be soaked in sterile water or in sterile towels wet with sterile water or sterile saline solution just before use in order to increase pliability. When precipitating the insoluble salts of cgae, the CMC solution may have ethyl, propyl or isopropyl alcohol added to it below the concentration that will precipitate the CMC, in order to facilitate the precipitation of the insoluble salts of cgae. Likewise, when extruding CMC solutions into solutions of the precipitating cations, either or both CMC and cation solutions may contain such concentrations of these alcohols. Concentrations of salts containing the precipitating cations may be from 1 to 50 wt. percent or up to the saturation concentration if below 50 percent. The concentration of the CMC solutions may be from 1 wt. percent up to where the solution becomes too viscous— usually up to about 8 percent in the case of low DP CMC and about 2 percent with CMC of high DP.

Another method of making sutures from these materials is to draw the CMC solution through the precipitating cation solution so as to yield fine filaments of thickness about 0.5 to 0.9 mil and lengths of preferably above about 2 inches but not necessarily of equal or very long lengths. Such filaments are penetrated very quickly by the diffusing ions and they can be stretched as they are drawn out, for example, by a rotating drum to which one end of a filament is attached. These fine filaments are then washed in water, combed or carded to align them parallel to each other if required and then spun into threads of the desired composite thickness, similar to the manner in which thread is made from cotton fibers.

It is also convenient to extrude a viscous solution of CMC containing aluminum acetate or other complexed salt of the above listed cations, so that the insoluble reaction-product of aluminum ion and CMc does not precipitate until after the mixed solution is extruded— or it may be poured on a plate to make a film. The filament— or film— is then washed, stretched, warmed and dried as above.

Any of the disclosed filaments or films of oriented water-insoluble compounds of the disclosed metal cations and cgae may be contacted with a dilute solution of a strong acid such as HCl and the compounds partially or completely converted into the corresponding cgae which is then washed with water or water-alcohol in which the filaments or films are not soluble and the compounds so formed will retain the orientation of the insoluble salt and the resulting compound will have its resorbability increased and will eventually be completely resorbed if the corresponding CMC is in the medium or low viscosity range. This is thus a means of accurately adjusting the resorbability and can be done after testing the resorbability of the given batch.

Sizes of sutures, specifications, testing procedures and methods of sterilizing and packaging are described in the U.S. Pharmacopeia, distributed by Merck Publishing Co., Easton, Pa. Standard suture sizes are from about 1 to 38 mils in thickness but from 1 to 16 mils is preferred. There are various types and sizes of needles, viz. eyed needles, needles swaged or screwed to the suture strand, straight, curved, half-curved, with cutting edges, etc. Techniques of testing absorption in the tissues are described by Jenkins, *Archives of Surgery*, vol. 44, p. 881, May 1942; vol. 45, p. 74, July 1942.

Having thus described my invention, what I claim is:

1. In a surgical suture and needle combination the improvement comprising a suture of at least one filament of stretched and oriented, solid, essentially water-insoluble, non-toxic complex of at least one cellulose acid ether selected from the class consisting of cellulose glycolic acid ether, cellulose hydroxypropionic acid ether, hydroxyethyl cellulose glycolic acid ether and mixtures of the same said ethers having lower alkoxy groups substituted for less than 50 per cent of the hydroxyl radicals contained in the glucose subunits of said cellulose; and at least one cation selected from the class consisting of aluminum, chromic, ferric, ferrous, silver, stannous and zinc and mixtures of same; said needle and suture being sterile, and the said compound being in the form of pliable filaments having a diameter between 1 and 16 mils and having good knotability and good knot- and straight-pull strength.

2. The product of claim 1 wherein at least a portion of the hydrogen ions of said ether are replaced by said cations.

3. The product of claim 2 wherein the said ether has been oriented by the action of diffusion- and membrane-potentials on the polar groups of said ether before the said hydrogen ions were replaced by said cations.

4. The product of claim 1 wherein the said complex contains up to 10 percent of its weight of a material selected from the class consisting of casein and zein.

5. The combination of claim 1 further being packaged in a sterile solution of ethyl alcohol containing from 5 to 10 percent of its weight of water.

6. The product of claim 1 wherein the said cellulose acid ether is cellulose glycolic acid ether and the said cation is aluminum ion.

7. The product of claim 6 wherein the said cellulose glycolic acid ether has a viscosity of between 18 and 2000 centipoises in 2 weight per cent aqueous solution at 25°C. and the said product is resorbable in live mammalian tissue in from 4 to 90 days.

8. The product of claim 6 wherein the said ether has been oriented through the action of diffusion- and membrane-potentials on its polar groups.

9. The product of claim 1 wherein the said ether has been oriented through the action of diffusion- and membrane-potentials upon the polar groups of said ether.

10. The product of claim 1 that is moistened before use with a sterile solution.

11. The method of making a surgical suture which comprises in succession the steps of: diffusing at least one cation of an aqueous solution selected from the class consisting of aluminum, chromic, ferric, ferrous, silver, stannous and zinc ions, through a semipermeable membrane into an aqueous solution of the sodium salt of at least one cellulose acid ether selected from the class consisting of cellulose glycolic acid ether, cellulose hydroxypropionic acid ether, hydroxyethyl cellulose glycolic acid ether and mixtures of the same said ethers having lower alkoxy groups substituted for less than 50 per cent of the hydroxyl radicals contained on the glucose subunits of said cellulose; said acid ether being characterized by a degree of substitution between 0.4 and 1.4 and a degree of polymerization such that the viscosity of a 2 weight per cent aqueous solution at 25°C. is more than about 18 centipoises and of a 1 weight per cent aqueous solution at 25°C. is less than about 4,500 centipoises; forming a thin film of the complex of the said cation and the said cellulose acid ether on said membrane, the molecules of said complex being oriented by the action of the diffusion- and membrane-potentials on the polar groups of the said ether, such potentials arising through the unequal diffusion rate of ions through said membrane; washing said thin film and forming it into a strand of from 1 to 16 mils in diameter and stretching and drying said strand under tension; sterilizing said strand and packaging it so that its sterility is maintained.

12. The method of claim 11 wherein the said film is slit longitudinally into narrow strips before being stretched and dried and the said strips formed into a composite strand of between 1 and 16 mils thick and then stretching and drying said composite strand while it is held under tension in stretched condition and ster- 13. The method of making a surgical suture which comprises extruding a viscous solution of the sodium salt of at least one cellulose acid ether selected from the class consisting of cellulose glycolic acid ether, cellulose hydroxypropionic acid ether, hydroxyethyl cellulose glycolic acid ether and mixtures of the same said ethers having lower alkoxy groups substituted for less than 50 per cent of the hydroxyl radicals contained on the glucose subunits of said cellulose; said acid ether being characterized by a degree of substitution between 0.4 and 1.4 and a degree of polymerization such that the viscosity of a 2 weight per cent aqueous solution of it at 25°C. is more than about 18 centipoises and of a 1 weight per cent aqueous solution at 25°C. is less than about 4,500 centipoises; into an aqueous solution of at least one cation selected from the class consisting of aluminum, chromic, ferric, ferrous, silver, stannous ans zinc ions so as to form a filament and permit the diffusion of said cation into said extruded solution whilst keeping the diameter of said extruded filament below about 10 mils so that said cations diffuse a substantial portion of said extruded solution to form an insoluble complex; stretching the filament of said insoluble complex longitudinally; washing said filament with water; warming and drying the washed filament while it is held under tension in stretched condition and sterilizing and storing it in a package adapted to maintaining it in sterile condition.

* * * * *